(12) United States Patent
Fujiwara et al.

(10) Patent No.: US 7,092,331 B2
(45) Date of Patent: Aug. 15, 2006

(54) REPRODUCTION OF AUDIO DATA FROM RECORDING MEDIUM

(75) Inventors: Kazunobu Fujiwara, Hamamatsu (JP); Tadashi Sugiyama, Hamamatsu (JP); Sadayuki Narusawa, Hamamatsu (JP)

(73) Assignee: Yamaha Corporation, Hamamatsu (JP)

(*) Notice: Subject to any disclaimer, the term of this patent is extended or adjusted under 35 U.S.C. 154(b) by 713 days.

(21) Appl. No.: 10/083,013

(22) Filed: Feb. 26, 2002

(65) Prior Publication Data
US 2002/0118616 A1  Aug. 29, 2002

(30) Foreign Application Priority Data
Feb. 28, 2001  (JP)  ............................. 2001-054573

(51) Int. Cl.
*G11B 5/09* (2006.01)
(52) U.S. Cl. ................................ 369/47.29; 369/47.33
(58) Field of Classification Search ............ 369/47.29, 369/47.32, 47.33, 47.34, 47.35
See application file for complete search history.

(56) References Cited

U.S. PATENT DOCUMENTS

| | | | | |
|---|---|---|---|---|
| 5,502,703 A | * | 3/1996 | Yamada et al. | 369/47.54 |
| 5,802,026 A | * | 9/1998 | Tsukihashi | 369/47.29 |
| 5,970,208 A | * | 10/1999 | Shim | 386/126 |
| 6,211,800 B1 | * | 4/2001 | Yanagihara et al. | 341/50 |
| 6,587,411 B1 | * | 7/2003 | Hayashi | 369/47.29 |
| 6,785,195 B1 | | 8/2004 | Kanazawa et al. | 369/24.01 |

FOREIGN PATENT DOCUMENTS

| | | |
|---|---|---|
| JP | 9219064 | 8/1997 |
| JP | 10-154373 | 6/2000 |
| JP | 2000-251390 | 9/2000 |

OTHER PUBLICATIONS

Notice of Reasons for Rejection for Japan Patent Office, dated Jun. 28, 2005.

* cited by examiner

*Primary Examiner*—William Korzuch
*Assistant Examiner*—Adam R. Giesy
(74) *Attorney, Agent, or Firm*—Pillsbury Winthrop Shaw Pittman LLP

(57) ABSTRACT

The present invention provides an audio data recording medium reproducer, wherein CPU 10 which writes audio data read by reader 11 into buffer memory 13 and buffer memory controller 21 which transfers the data to buffer memory 22 and inputs it into DAC 23 at a predetermined data rate are connected by a bus, and furthermore, CPU 20 for controlling a user interface is separately provided. Provision of a plurality of such simple controllers reduces costs to be lower than in the case of providing one high-performance controller. Furthermore, it also becomes possible to separately construct the respective functional parts as units.

4 Claims, 7 Drawing Sheets

REPRODUCTION OF AUDIO DATA FROM RECORDING MEDIUM

This application is based on and claims priority of Japanese Patent Application No. 2001-054573, filed on Feb. 28, 2001, the whole contents of which are incorporated herein by reference.

BACKGROUND OF THE INVENTION

FIELD OF THE INVENTION

The present invention relates to an audio data recording medium reproducer for reproducing media such as audio compact disks (CDs).

DESCRIPTION OF THE RELATED ART

Figure 6:
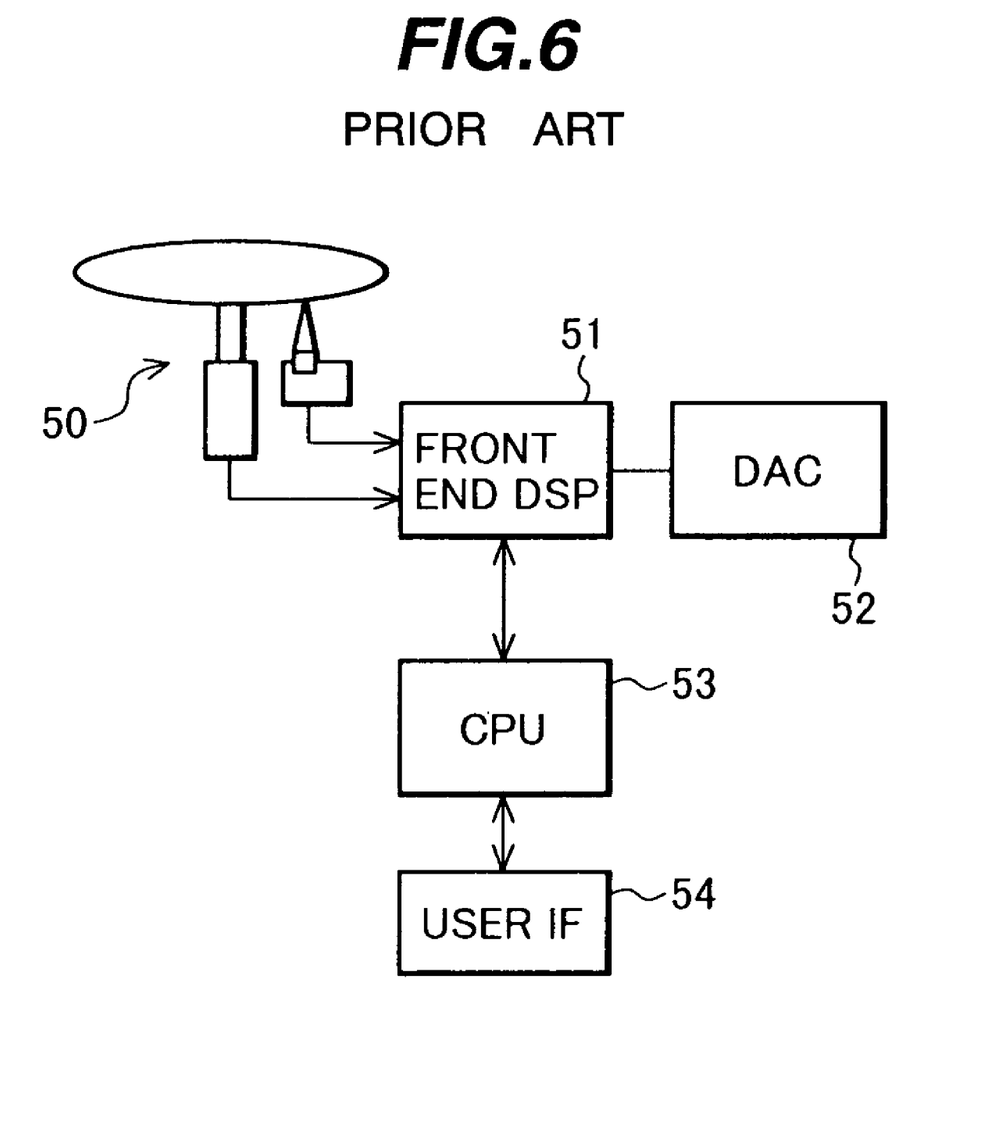
FIG. 6 is a block diagram showing a conventional audio CD reproducer.

FIG. 6 shows a conventional general audio CD reproducer. Reader 50 for reading data from a CD set on a tray and front end digital signal processor (DSP) 51 for controlling the reader 50 are directly connected to a digital-analog converter (DAC), and the DAC digital-analog converts digital audio data outputted by the front end DSP 51 and outputs analog audio signals. CPU 53 is connected to the front end DSP 51. This CPU 53 is exclusive for controlling user interface 54 such as an operation button and a display, and does not directly control data readout and reproduction. In such an audio CD reproducer, readout data is inputted into the DAC at a normal speed without buffering or with only minimum buffering required for reproduction. Therefore, if the tracking of the reader 50 deviates due to vibrations, the audio data is not inputted into the DAC 52 from the front end DSP 51, and the outputted sound skips.

SUMMARY OF THE INVENTION

An object of the invention is to provide an audio data recording medium reproducer which has a high tolerance for errors when reading-out audio data from a medium into which the audio data has been recorded.

Another object of the invention is to provide an audio data recording medium reproducer which has a high tolerance for reading-out errors and can suppress an increase in manufacturing costs.

According to one aspect of this invention, there is provided an audio data recording medium reproducer, which comprises a medium reader for reading-out digital audio data from a medium, into which the data has been recorded, at a speed faster than the audio data reproducing rate; a first buffer memory for buffering the data readout by the medium reader; a first controller for controlling the medium reader and controlling reading and writing of the first buffer memory; a second buffer memory for buffering the data transferred from the first buffer memory; a DA converter which receives data from the second buffer and DA-converts the data into analog audio signals; and a second controller for controlling reading and writing of the second buffer memory, wherein the first controller and the second controller are connected via an interface.

The medium reader, the first buffer memory, and the first controller are preferably constructed as a single unit.

Separately from the second controller, a third controller for controlling a user interface may be provided.

The medium into which the audio data has been recorded is, for example, a compact disk.

According to another aspect of this invention, there is provided an audio data recording medium reproducer, which comprises a medium reader for reading-out digital audio data from a medium, into which the audio data has been recorded, at a speed faster than the audio data normal reproducing rate; a first buffer memory for buffering the data readout by the medium reader, a first controller for controlling the medium reader and controlling reading and writing of the first buffer memory; a second buffer memory for buffering data transferred from the first buffer memory; a DA converter which receives the data from the second buffer memory and DA converts the data into analog audio signals for reproduction at a normal speed; and a second controller for controlling reading and writing of the second buffer memory, wherein the first controller and second controller are connected via an interface, and data transfer between the first buffer memory and second buffer memory is intermittently carried out.

The medium reader reads audio data from a medium at a speed faster than the audio data reproducing rate. The controller for controlling buffering of data that is read by the medium reader and the controller for outputting the buffered data to the DA converter are separately constructed. The buffer memory is also separated into a first buffer memory and a second buffer memory. The controllers may only take charge of writing data into the corresponding buffer memories and inputting data into the DA converter, so that the controllers can be constructed by elements that are inexpensive in comparison with the case of one high-speed controller. Furthermore, data transfer between the first buffer memory and the second buffer memory is at a speed that is much faster than the data readout speed of the medium reader and the converting rate of the DA converter, so that occasionally data may be collectively transferred, and the burden of transfer processing is slight. The intermittent operation includes periodic operation and irregular operation. When performing periodic operation, a period determined based on the capacity of the second buffer memory may be applied. In a case of performing irregular operation, a request may be sent to the first controller when the second controller detects that the remaining amount of the second buffer memory becomes small.

Thus, since two combinations exist, that is, a combination of the first controller and first buffer memory and a combination of the second controller and second buffer memory are separately provided, and in addition, the first controller and first buffer memory are constructed to be a single unit, mounting and replacement of these become easy, and the unit can be replaced with another one. The medium is generally a compact disk (CD), however, other than this, media such as a digital versatile disk(DVD), hard disk (HDD), and magneto-optical(MO) disk can also be applied. The interface for connecting the first controller and second controller may be of any type, and in a case of applying a general-purpose interface, an ATA/ATAPI bus interface or SCSI interface may be used.

As described above, the control of a high-performance audio CD reproducer is separately performed by a plurality of controllers. Therefore, the controllers can be constructed compactly at low costs. Since the reproducer is comprised of units for each controller, manufacturing, assembly, replacement, and repair can be made easy.

DESCRIPTION OF THE PREFERRED EMBODOIMENTS

Figure 1A:
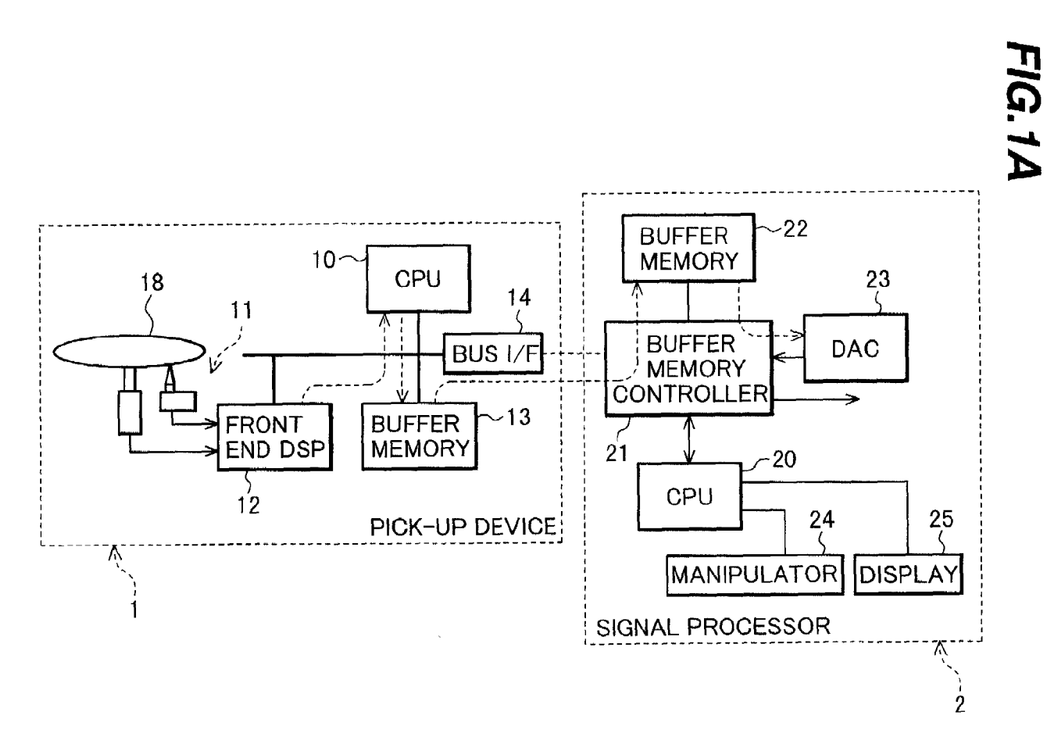
FIGS. 1A and 1B are a block diagram and a front view of an audio CD reproducer according to an embodiment of the invention.
Figure 1B:
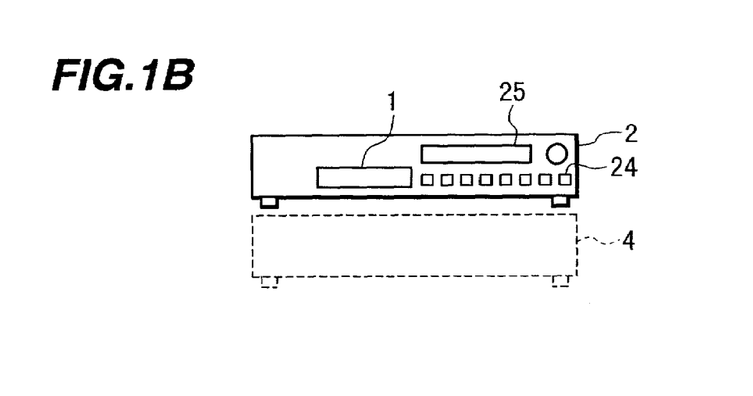

FIG. 1A is a block diagram of an audio CD reproducer according to an embodiment of the present invention. The audio CD reproducer reads digital audio data that has been recorded into an audio CD 18, and converts this data into analog audio signals and outputs them to the outside. The audio CD reproducer comprises signal processor 2 and pick-up device 1 onto which a compact disk (CD) 18 is set. The pick-up device 1 and signal processor 2 receive and transmit digital audio data and control signals via an ATAPI bus. As shown in FIG. 1B, the signal processor 2 has a casing as an audio component. The casing as an audio component has a front panel which is made from a material and has a horizontal width (40 cm–45 cm), which are common for other components such as an equalizer amplifier and a main amplifier, and when these components are accumulated vertically, a unified appearance is obtained. The pick-up device 1 is attached to the inside of the signal processor 2 in the form of units, and connected by an ATAPI bus cable.

The pick-up device 1 comprises a CPU 10, a reader 11, a front end DSP 12, a buffer memory 13, and a bus interface 14. The CPU 10 controls the entire operation of the pick-up device 1, particularly, monitoring of the buffer memory 13 and communications with the signal processor 2. The reader 11 irradiates a laser beam onto the recording surface of the audio CD 18 while turning the audio CD to optically read data on the tracks. The front end DSP 12 controls turning of the disk, focusing and tracking of the laser beam in accordance with instructions from the CPU 10. When the CPU 10 receives an instruction to readout data on any of the tracks (pieces of music) from the signal processor 2, the CPU transmits an instruction of reading data to the front end DSP 12. The front end DSP 12 turns the disk and optically reads data in response to this instruction, and inputs the data into the CPU 10. The CPU 10 stores the data into the buffer memory 13. The reader 11 can readout data from a CD at a speed several tens of times (24 through 40 times) the audio reproducing rate. The buffer memory 13 has a capacity of approximately 8 MB. The data stored in the buffer memory 13 is intermittently readout in sector units by the signal processor 2. Intermittent reading may be periodically or irregularly performed, however, the average reading rate resulting from averaging in time base is the same as the digital audio reproducing rate. The writing rate into the buffer memory 13, that is, the data readout rate from a CD is as high as several tens of times the readout rate from this buffer memory 13, so that the CD data readout by the reader 11 is intermittently performed. The audio data readout from the buffer memory 13 by the signal processor 2 is performed via bus interface 14 and an ATAPI bus.

The signal processor 2 comprises a CPU 20, a buffer memory controller 21, a buffer memory 22, a digital-analog converter (DAC) 23, a manipulator (or operation unit) 24, and a display 25. The manipulator 24 comprises a play button, stop button, skip button, track number input button, and volume adjuster, and a user controls CD reproduction by manipulating this manipulator 24. This manipulator 24 may include an infrared ray remote-controller system. The display 25 is a liquid crystal display (LCD) or light emitting diode (LED) matrix display or the like, which displays the disk play time and the track number which is being played.

The buffer memory controller 21 includes an ATA/ATAPI bus interface inside, and carries out communication with the pick-up device 1 to receive digital audio data stored in the buffer memory 13, controls writing of the received data into the buffer memory 22 (at the signal processor 2 side) and readout of the written data. DAC 23 is connected to the buffer memory controller 21. The DAC 23 converts data readout from the buffer memory 22 into analog audio data. The buffer memory 22 has a capacity of approximately 512 kB. The buffer memory controller 21 monitors the buffer memory 22, and when the data remaining amount becomes small, requests data transfer to the CPU 10 via the bus.

The CPU 20 operates for user interface control in the main, detects the manipulation of the manipulator 24 and controls the display contents on the display 25. Furthermore, the CPU 20 transmits the manipulation contents of the manipulator 24, for example, an instruction of a selected track number or track skipping to the buffer memory controller 21. In response to this, the buffer memory controller 21 controls writing and reading of the buffer memory 22, and notifies the CPU 10 of the pick-up device 1 of this via the bus.

When a user selects a track by manipulating the manipulator 24 and instructs reproduction start of the selected track, the CPU 20 reads the contents of this manipulation, changes the contents displayed on the display 25, and transmits the track number of the selected track to the CPU 10 of the pick-up device 1 via the buffer memory controller 21. Thereafter, when the buffer memory controller 21 receives a signal (flag set) indicating that transfer is ready, the buffer memory controller 21 transfers data from the buffer memory 13 to the buffer memory 22. The transferred data is outputted to the DAC 23 in accordance with the CD sampling rate and analog audio signals are reproduced.

Referring to the flowcharts of FIGS. 2A, 2B and 3 and setting examples of the buffer memories of FIGS. 4A and 4B, the operation of the CD reproducer will be explained hereinbelow.

Figure 2A:
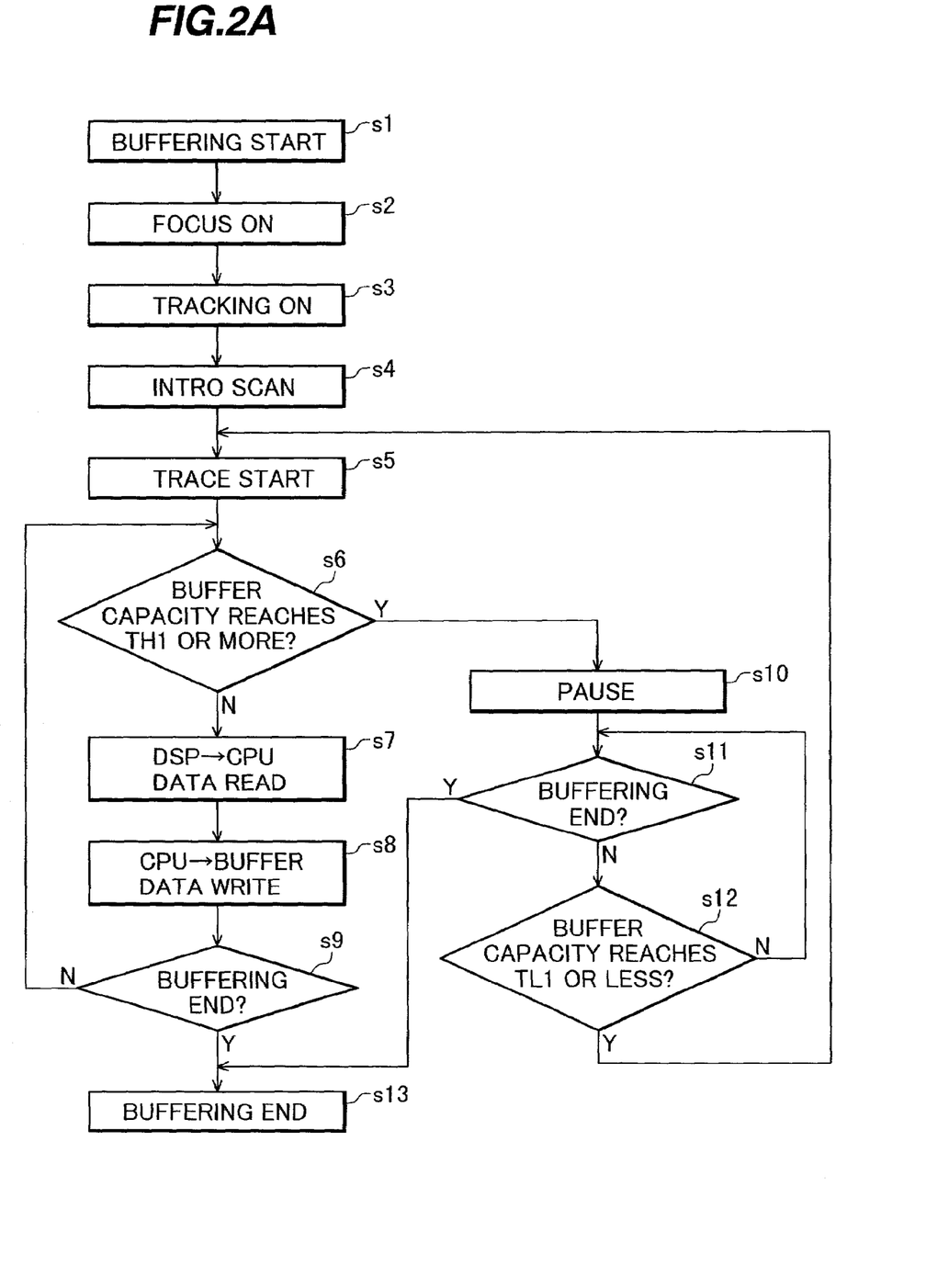
FIGS. 2A and 2B are flowcharts showing the buffering operation to be performed by a pick-up device of the audio CD reproducer shown in FIG. 1A.

FIG. 2A is a flowchart showing the operation of the pick-up device 1. FIG. 4A is a diagram showing a threshold setting example of the buffer memory 13 of the pick-up device 1. When the pick-up device 1 starts buffering into the buffer memory 13 (Step s1), laser focusing and tracking onto the CD 18 set at the reader 11 are turned on (Steps s2 and s3). Turning on of the focusing and tracking is performed by the front end DSP 12 in response to an instruction from the CPU 10. Then, the intro of the track to be read is scanned (Step s4), and then readout (tracing) of data of this track is started (Step s5). While it is monitored whether or not the data amount stored in the buffer memory 13 has reached the threshold TH1, the readout data is stored in the buffer memory 13 via the CPU 10 from the front end DSP 12 (Step s8). This readout and storing processing is continued until the data amount stored in the buffer memory 13 shown in FIG. 4A reaches the threshold TH1 or more, and when the amount reaches TH1 or more, the CPU 10 instructs a reading pause to the front end DSP 12 (Step s10).

The data stored in the buffer memory 13 of the pick-up device is intermittently readout by the signal processor 2 so that the average reading rate becomes equal to the reproducing rate of the DAC 23. A stand-by condition is maintained until the data remaining amount in the buffer memory 13 reaches TL1 or less (Step s12), and when the data remaining amount in the buffer memory 13 reaches TL1 or less due to readout by the signal processor 2, the process returns to Step s5, and tracing is restarted and CD data readout from and data storage into the buffer memory 13 are restarted. When the data to be readout ends during data storage into the buffer memory 13 (Step s9), that is, when buffering ends, there is no more data to be read, so that this buffering operation is ended (Step s13).

Figure 2B:
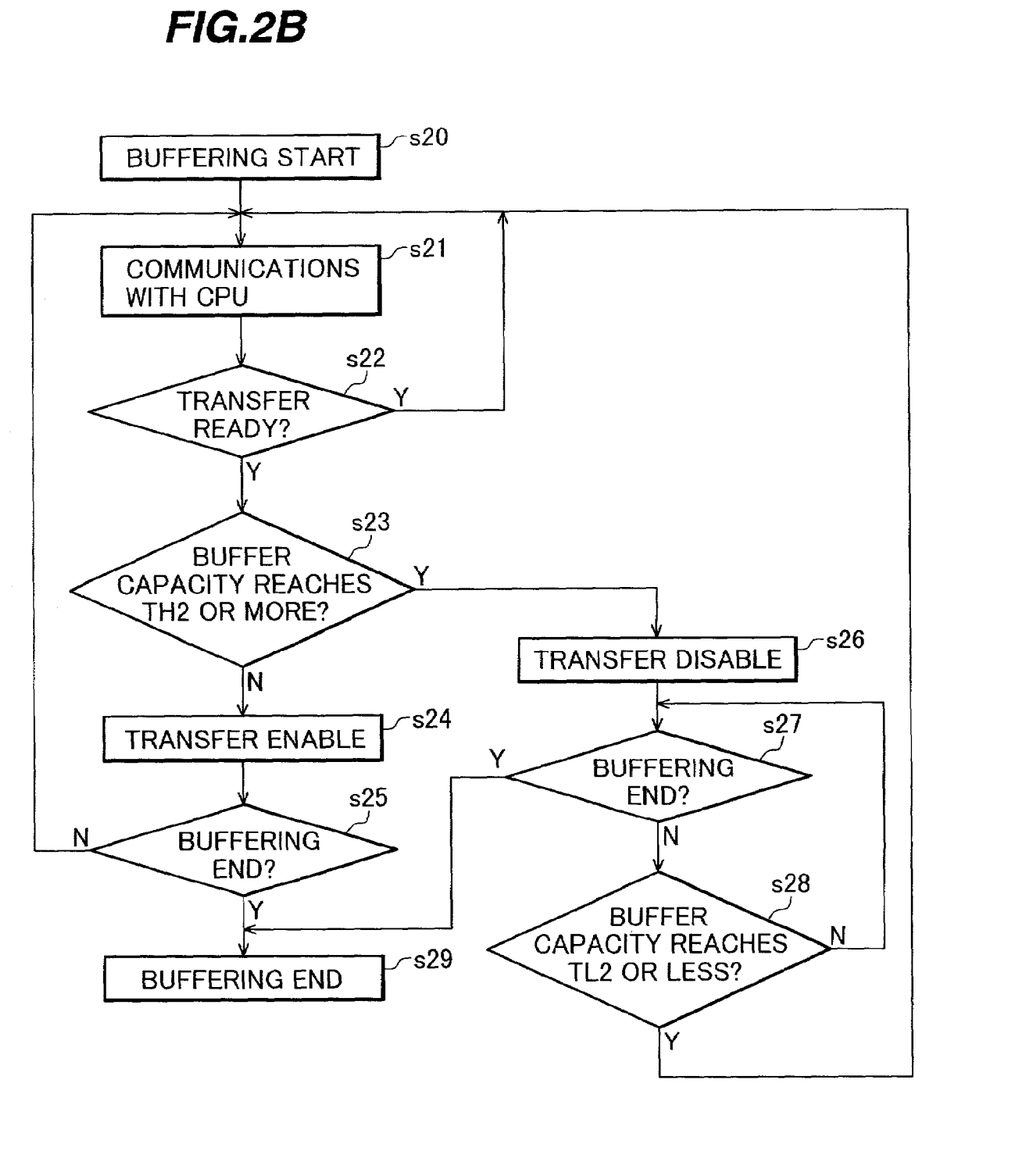

FIG. 2B is a flowchart showing the operation of the signal processor 2. FIG. 4B is a diagram showing a threshold setting example of the buffer memory 22 of the signal processor 2. When the signal processor 2 starts buffering into the buffer memory 22 (Step s20), access to the pick-up device 1 is made first (Step s21) to investigate whether or not transfer of data (stored in the buffer memory 13) is ready (Step s22).

This can be judged based on the set/reset of a flag which can be detected through the ATAPI bus. When transfer is not ready, a stand-by condition is maintained until transfer becomes ready. When transfer is ready (YES), the free area in the buffer memory 22 is confirmed (Step s23), and the data stored in the buffer memory 13 is transferred to the buffer memory 22 (of the signal processor 2) (Step s24). This transfer processing is performed by the buffer memory controller 21 in response to an Enable signal from the CPU 20, so that the CPU 20 does not directly relate to data transfer.

This transfer is performed while it is monitored whether or not the data amount stored in the buffer memory 22 reaches TH2 or more (Step s23), and when the amount reaches TH2 or more, this transfer processing is interrupted (Step s26). When the CPU 20 outputs a Disable signal to the buffer memory controller 21, the transfer processing is interrupted.

The buffer memory controller 21 readout the data stored in the buffer memory 22 at the CD reproducing rate (44.1 kHz in the case of normal-speed reproduction), and outputs the data to the DAC 23. The DAC 23 converts this digital audio data into analog audio signals, and outputs them to the outside. A stand-by condition is maintained until the data remaining amount in the buffer memory 22 reaches TL2 or less (Step s28), and when the data remaining amount in the buffer memory 22 reaches TL2 or less, the process returns to Step s21 to restart data transfer. When data to be transferred comes to an end during data transfer (Step s25), there is no more data to be transferred, so that the data transfer operation is ended (Step s29).

Figure 3:
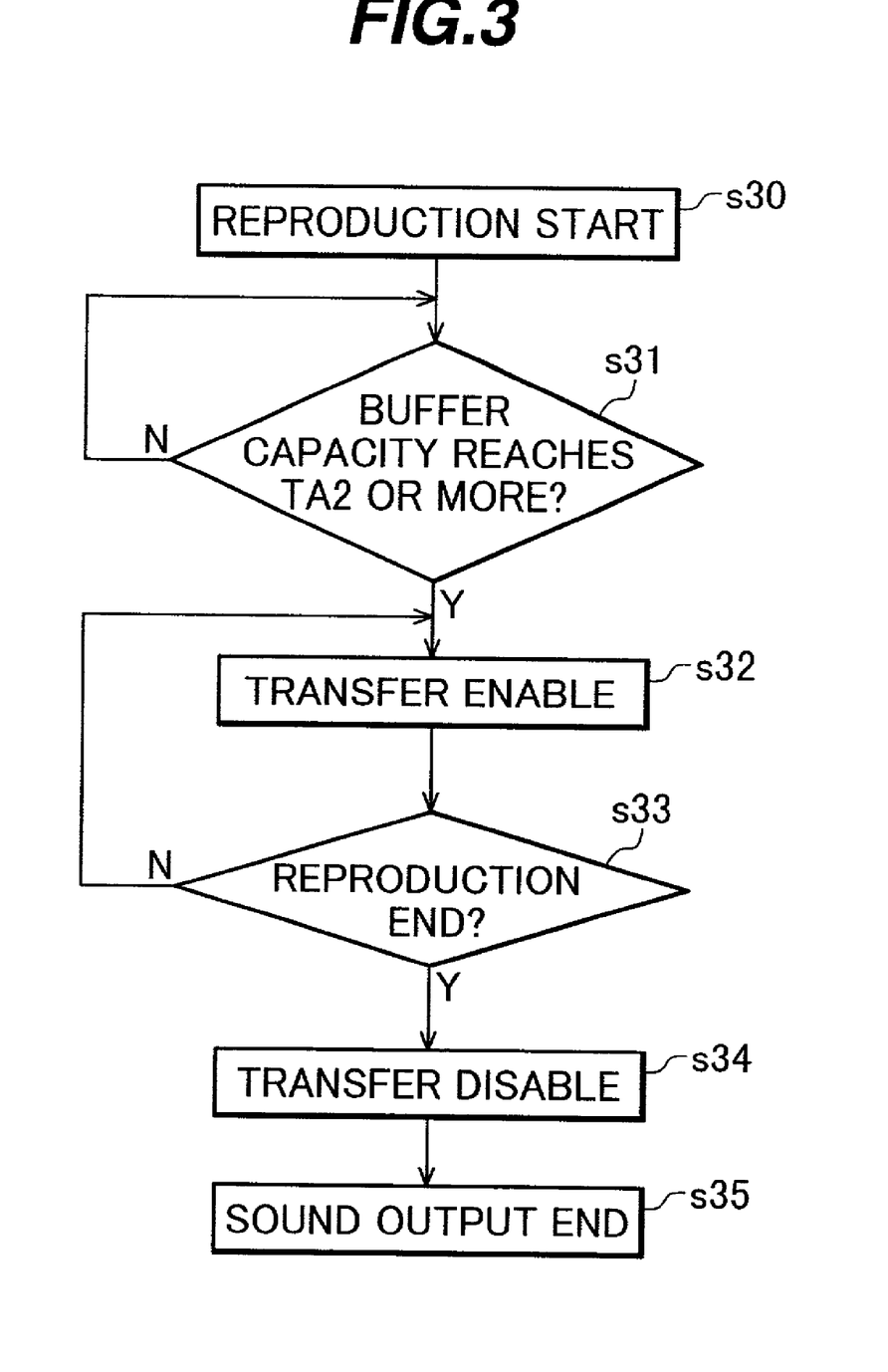
FIG. 3 is a flowchart showing the reproducing operation of a signal processor of the audio CD reproducer.
Figure 4A:
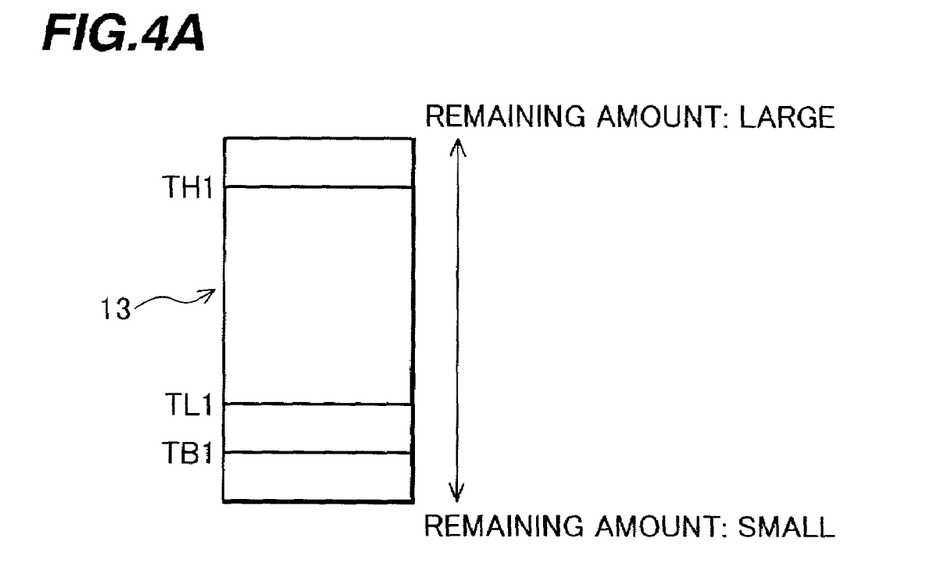
FIGS. 4A and 4B are diagrams showing setting examples of thresholds of buffer memories of the same audio CD reproducer.
Figure 4B:
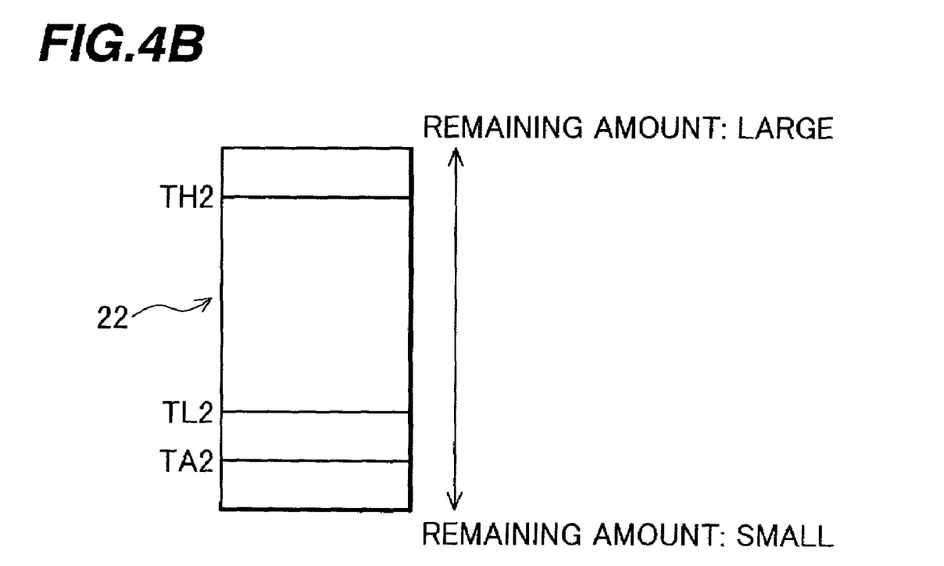

FIG. 3 is a flowchart at the data output side of the signal processor 2, that is, showing the CD audio reproducing operation. When starting reproduction of a piece of music (Step s30), first, a stand-by condition is maintained until data of TA2 or more is stored in the buffer memory 22 (Step s31). This data storage is performed by the operation shown in FIG. 2B. When data is stored, the data is transferred from the buffer memory 22 to the DAC 23 (Step s32). This data transfer is performed by the buffer memory controller 21 in response to an Enable signal from the CPU 20. This operation is continuously performed until reproduction of the predetermined track number is ended. When output of all data ends (Step s33), data transfer from the buffer to the DAC is interrupted (Step s34), and then the reproducing operation is ended (Step s35). Interruption of data transfer is performed in response to an output of a Disable signal from the CPU 20 to the buffer memory controller 21.

Figure 5:
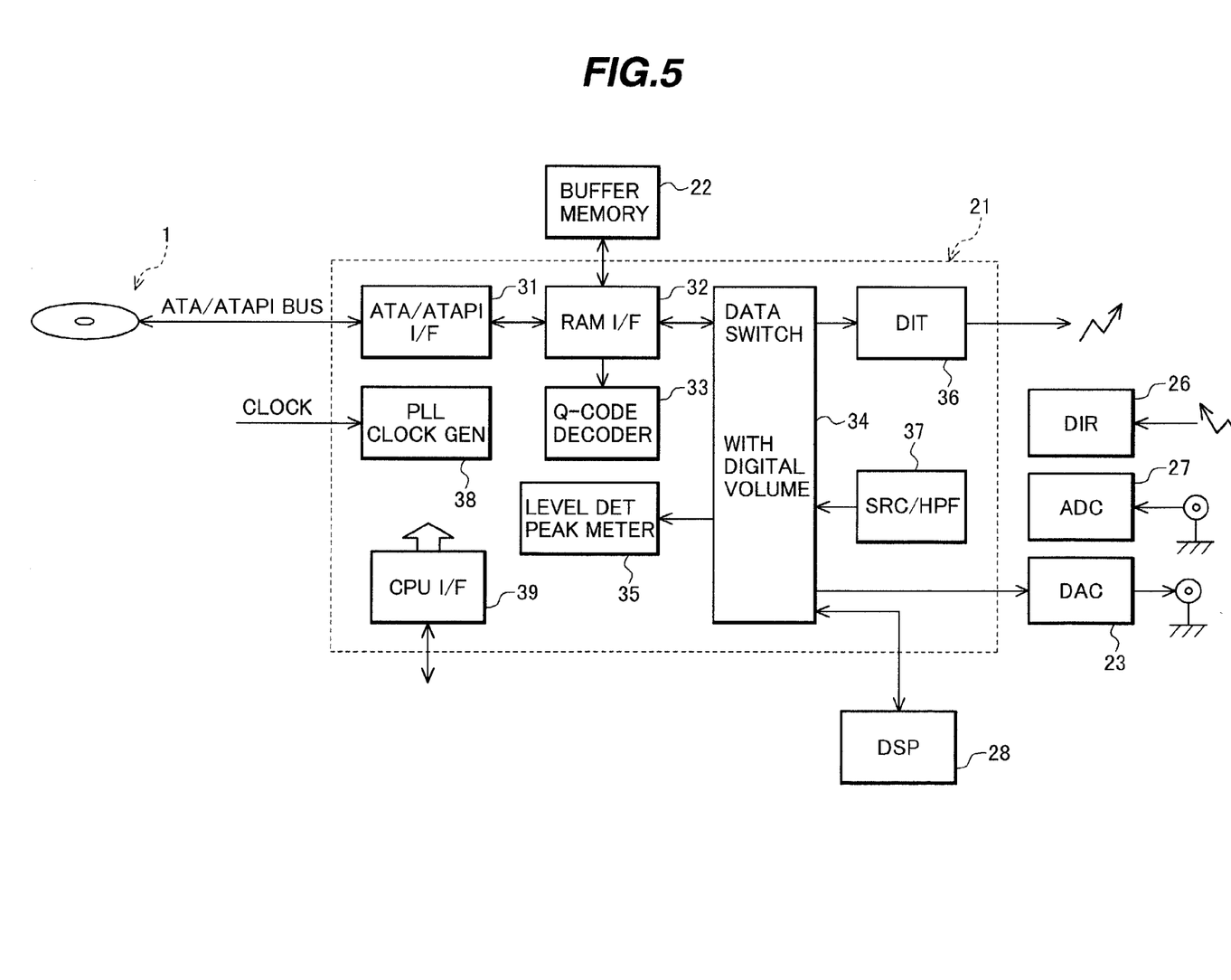
FIG. 5 is a block diagram showing an example of a buffer memory controller of the same audio CD reproducer.

FIG. 5 is a block diagram showing an example of the buffer memory controller 21 in the abovementioned audio CD reproducer. This buffer memory controller 21 is comprised of one LSI, and has bus interface 31, RAM interface 32, Q code decoder 33, data switch 34, level detector 35, DIT (Digital Audio Interface Transmitter) 36, SRC/HPF (Sampling Rate Converter/High Pass Filter) 37, PLL clock generator 38, and CPU interface 39. The ATA/ATAPI bus interface 31 is an interface for accessing the pick-up device 1 via the ATAPI bus. The RAM interface 32 is an interface for controlling writing/readout into/from the buffer memory 22. The Q code decoder 33 detects a subcode (Q code) from the data read-in from the pick-up device 1 and reads out the track number, intro scan code, and time data. PLL clock generator 38 is a circuit for generating clock signals synchronized with clock signals inputted from the pick-up device 1, and this LSI operates in response to the clock signals.

DIT 36 is a transmitting circuit for externally outputting digital audio data as a data stream. Digital audio Interface Receiver (DIR) 26 and Analog-Digital Converter (ADC) 27 as input circuit parts are connected to the SRC/HPF 37. The DIR 26 is a circuit part for inputting a digital audio data stream, and the ADC 27 is a circuit for converting inputted analog audio signals into a digital audio data stream. The SRC/HPF 37 operates as a sample rate converter when inputting into the DIR. This LSI operates at a sampling rate of 44.1 kHz that is the CD standard. Signals to be inputted as a data stream include signals with various sampling frequencies that are DAT or DVD standards (for example, 96 kHz, 48 kHz, 32 kHz, etc.) These signals are converted by the SRC into 44.1 kHz data. Since the signals inputted from the ADC contain DC components, so that the SRC/HPF serves as an HPF to eliminate these components.

The data switch 34 selects either the data which the RAM interface 32 has readout from the buffer memory 22 or the data inputted from the SRC/HPF 37 as input data, and outputs the selected data to the DAC 23 and DIT 36. Signal processing DSP 28 is externally connected, and the data switch 34 controls inputs and outputs of this DSP when an effect such as Hall reverberation is applied by using this DSP.

The level detector 35 is connected to the data switch 34. The level detector 35 detects the level and peak value of the audio data inputted into the data switch 34. The data switch 34 also serves as a digital volume adjuster, and based on the results of detection by the level detector 35, converts the audio data level so as to obtain a volume value instructed by the CPU 20. The volume value instructed by the CPU 20 is a value inputted by a user through manipulation of the manipulator 24.

By providing buffer memory controllers thus constructed, the CPU 20 is required to only control the user interface, and is not required to perform audio data processing, so that use of an inexpensive low-speed CPU becomes possible.

A CD reproducer is explained above, however, the medium is not limited to a CD, and may be any type of medium such as an MD, HDD, or MO. The pick-up device 1 is constructed as units, whereby these units may be constructed so that they can be replaced in an inserted manner or a plurality of units are simultaneously connected. A case where the buffer memory controller 21 controls the second buffer memory is explained above, however, the CPU 20 may control input and output of the buffer memory 22. The interface connecting the CPU 10 and buffer memory controller 21 is also not limited to the ATA/ATAPI bus interface, and various interfaces such as an SCSI interface can be applied.

The capacity of the buffer memory 13 is set to 8 MB and the capacity of the buffer memory 22 is set to 512 kB, however, the capacities of the buffer memories are not limited to these, but may be properly determined taking the functions of the reader 11 into consideration.

The invention is explained above according to an embodiment, however, the invention is not limited to this. For example, it will be obvious for those skilled in the art that various modifications, improvements, and combinations are possible.

What we claim are:

1. An audio data recording medium reproducer comprising:
    a medium reader for reading-out digital audio data from a medium, into which the data has been recorded, at a speed faster than the audio data normal reproducing rate;
    a first buffer memory for buffering the digital audio data read-out by the medium reader;
    a first controller for controlling the medium reader and controlling reading and writing of the first buffer memory;
    a second buffer memory for buffering the digital audio data transferred from the first buffer memory;
    a D/A converter which receives the digital audio data from the second buffer memory and D/A-converts it into analog audio signals for normal speed reproduction and
    a second controller for controlling reading and writing of the second buffer memory, wherein the first controller and second controller are connected via an interface, data transfer between the first buffer memory and second buffer memory is intermittently performed, said first controller controls writing of the first buffer memory to be done intermittently at a speed higher than the normal reproducing speed, and said second controller monitors a remaining data amount in the second buffer memory, and when the remaining data amount becomes small, reads the digital audio data from the first buffer memory and writes the digital audio data into the second buffer memory.

2. The audio data recording medium reproducer of claim 1, wherein said first buffer memory has a larger capacity than the second buffer memory.

3. An audio data recording medium reproducer comprising:
    a medium reader for reading-out digital audio data from a medium, into which the data has been recorded, at a speed faster than the audio data normal reproducing rate;
    a first buffer memory for buffering the digital audio data read-out by the medium reader;
    a first controller for controlling the medium reader and controlling reading and writing of the first buffer memory;
    a second buffer memory for buffering the digital audio data transferred from the first buffer memory;
    a D/A converter which receives the digital audio data from the second buffer memory and D/A-converts it into analog audio signals for normal speed reproduction; and
    a second controller for controlling reading and writing of the second buffer memory, wherein
    the first controller and second controller are connected via an interface, data transfer between the first buffer memory and second buffer memory is intermittently performed, and said second controller monitors a remaining data amount in the second buffer memory, and when the remaining data amount becomes small, reads the digital audio data from the first buffer memory and writes the digital audio data into the second buffer memory.

4. An audio data recording medium reproducer according to claim 3, wherein: said first buffer memory has a larger capacity than the second buffer memory.

* * * * *